(12) United States Patent
Heitzmann et al.

(10) Patent No.: US 8,475,619 B2
(45) Date of Patent: Jul. 2, 2013

(54) PROCESS FOR IMPROVING THE ADHESION OF A UV-CROSSLINKABLE MATERIAL TO A SUBSTRATE

(75) Inventors: Marie Heitzmann, Sinard (FR); Mohammed Benwadih, Champigny sur Marne (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 287 days.

(21) Appl. No.: 12/832,655

(22) Filed: Jul. 8, 2010

(65) Prior Publication Data
US 2011/0024034 A1    Feb. 3, 2011

(30) Foreign Application Priority Data

Jul. 9, 2009    (FR) ..................................... 09 03393

(51) Int. Cl.
*B29C 65/14*    (2006.01)
(52) U.S. Cl.
USPC ..................................... 156/275.5
(58) Field of Classification Search
USPC .......................................... 156/272.2, 275.5
See application file for complete search history.

(56) References Cited

U.S. PATENT DOCUMENTS

| | | | |
|---|---|---|---|
| 2004/0072933 A1* | 4/2004 | Shustack | 524/280 |
| 2004/0168762 A1* | 9/2004 | Fricke et al. | 156/275.5 |
| 2004/0259992 A1* | 12/2004 | Gobel | 524/261 |
| 2007/0246441 A1* | 10/2007 | Kim et al. | 216/41 |
| 2009/0035565 A1 | 2/2009 | Serbutoviez et al. | |

FOREIGN PATENT DOCUMENTS

EP    2 022 816 A2    2/2009

OTHER PUBLICATIONS

Manmeet Kaur et al., "Photopolymerisation of styrene initiated by triphenyl bismuthonium ylide", Macromolecular Rapid Communications vol. 21, No. 6, Aug. 25, 1999, pp. 291-295.

Sung Kyu Park et al., "Solution-Process TIPS-Pentacene Organic Thin-Film-Transistor Circuits", IEEE Electron Device Letters, vol. 28 No. 10 Oct. 2007, Oct. 2007, pp. 877-879.

Anila Asif et al., "Photopolymerization of waterborne polyurethane acrylate dispersions based on hyperbranched aliphatic polyester and properties of the cured films", Colloid Polymer Science (2005) 283, Oct. 19, 2004, pp. 721-730.

Search Report for counterpart French Application 09/03393, dated Apr. 9, 2010.

* cited by examiner

*Primary Examiner* — Daniel McNally
(74) *Attorney, Agent, or Firm* — Greenblum & Bernstein, P.L.C.

(57) ABSTRACT

The invention relates to a process for improving the adhesion of a layer made of a material that is crosslinkable by exposure to UV rays to a substrate, and also to a process for manufacturing a transistor comprising at least one step of performing such a process.

This process for improving the adhesion of a layer made of a material M to the surface of a substrate S is characterized in that:

the material M is a material that is crosslinkable by exposure to UV rays,
and in that it comprises the following steps:
a) deposition, on at least one surface of the substrate S, of a nonpolymerized polymerizable composition P, comprising at least one molecule F comprising a first reactive group F1 that is capable of reacting, by exposure to UV rays, with a reactive group M1 of the surface of the material M, and a second reactive group F2 that is capable of forming bonds with the material(s) constituting the surface of the substrate S,
b) deposition, onto the layer of the nonpolymerized composition P obtained in step a), of a layer made of a noncrosslinked material M, and
c) exposure to UV rays of the three-layer structure obtained in step b).

The invention finds application in particular in the field of manufacturing transistors.

9 Claims, No Drawings

_US 8,475,619 B2_

1

PROCESS FOR IMPROVING THE ADHESION OF A UV-CROSSLINKABLE MATERIAL TO A SUBSTRATE

CROSS-REFERENCE TO RELATED APPLICATIONS

The present application claims priority under 35 U.S.C. §119(a) of French Patent Application No. 09/03393 filed Jul. 9, 2009, the disclosure of which is expressly incorporated by reference herein in its entirety.

BACKGROUND OF THE INVENTION

1. Field of the Invention

The invention relates to a process for improving the adhesion of a layer, made of a material that is crosslinkable by exposure to UV rays, to a substrate, and also to a process for manufacturing a transistor comprising at least one step of performing such a process.

2. Discussion of Background Information

In many fields, it is necessary to connect together a layer made of a polymeric material with a substrate made of another polymeric or metallic material or comprising metallic or even semiconductive regions.

A polymeric material is a material that is capable of polymerizing, and is formed from the repeated sequence of the same unit, the monomer, the monomers being connected together via covalent bonds.

To obtain a film made of a polymeric material that is resistant either to mechanical stresses, or to chemical stresses, or to both, a process of crosslinking such a polymeric material is used. For certain materials, the crosslinking may be performed by exposure to UV rays.

In all cases, during crosslinking, the polymeric material passes from the viscoelastic state to the solid, rigid, elastic and unmeltable state.

Moreover, the adhesion of a material to the surface of another material may be defined as a set of physical and/or chemical phenomena that arise when two surfaces are placed in contact.

Adhesion is linked to adhesiveness, i.e. the ability to create forces of interaction between the two surfaces, at the surface state, i.e. the specific surface area, the porosity, the active sites and the pollution, of the two surfaces to be adhered together, and of the wettability of these two surfaces, i.e. their ability to create a mutual contact.

It is more particularly a matter of forces of adhesion, i.e. forces of cohesion of the materials, for example by creation of interatomic bonds.

These interatomic bonds may be intramolecular, as in the case of covalent chemical bonds, or intermolecular, as in the case of weak physical bonds.

The problem of improving the adhesion of a layer made of a polymeric material to the surface of a substrate made of a different material arises most particularly during the manufacture of a transistor.

Specifically, a transistor is generally composed of a substrate made of an organic semiconductive material, for example a modified pentacene, for example triisopropylsilyl pentacene (TIPS-pentacene), as described by Park et al. in "Solution-Processed TIPS-Pentacene Organic Thin-Film-Transistor Circuits, IEEE Electron Device Letters, Vol 28., No. 10, October 2007", or perylene, or of an inorganic semiconductive material such as silicon, germanium or gallium arsenide.

Onto this substrate are then deposited source and drain electrodes and also a grille, which are generally made of metal, more particularly of aluminum, gold, copper or silver, and form metallic regions on the surface of the substrate.

These metallic regions are deposited according to the desired pattern onto the surface of the substrate, generally via a photolithographic process.

In such a process, a layer of a material that can be crosslinked by exposure to UV rays, but not polymerized, is deposited onto the desired surface of the substrate.

A mask comprising openings with the desired pattern is deposited onto this surface and the whole is exposed to UV rays.

The exposed regions of the polymeric material, that can be crosslinked by exposure to UV rays, are crosslinked. In the other regions, the material remains in nonpolymerized and noncrosslinked form.

The nonpolymerized and noncrosslinked regions are then removed by means of a solvent and the metal is deposited in the laid-bare regions of the surface of the substrate.

However, in such a process, after exposure to UV rays, and during the removal of the desired regions of polymeric material that remain noncrosslinked, the regions of crosslinked polymeric material detach from the surface of the substrate due to its lack of adhesion, which causes the solvent to attack this material by lifting it.

In concrete terms, the solvent intermixes between the substrate and the layer of UV-crosslinkable polymeric material, which leads to a deposition of material not in accordance with the desired pattern.

It is also necessary, during the manufacture of a transistor, to deposit an insulating material onto the surface of the semiconductive material optionally already comprising metallic regions.

The same photolithographic process as previously is repeated and the same problems of lack of adhesion of the polymeric material that can be crosslinked by exposure to UV rays to the surface of the metal and of the semiconductive material once again arise.

SUMMARY OF THE INVENTION

The invention is directed toward solving the problem of lack of adhesion of a film made of a UV-crosslinkable polymeric material to a substrate.

To this end, the invention proposes a process for improving the adhesion of a layer made of a material M to the surface of a substrate S, characterized in that the material M is a material that can be crosslinked by exposure to UV rays, and in that it comprises the following steps:

a) deposition, on at least one surface of the substrate S, of a nonpolymerized polymerizable composition P, comprising at least one molecule F comprising a first reactive group F1 that is capable of reacting, by exposure to UV rays, with a reactive group Ml of the surface of the material M, and a second reactive group F2 that is capable of forming bonds with the material(s) constituting the surface of the substrate S, b) deposition, onto the layer of the nonpolymerized composition P obtained in step a), of a layer made of a non-crosslinked material M, and c) exposure to UV rays of the three-layer structure obtained in step b).

Preferably, the surface of the substrate S comprises at least one region made of one (or more) material(s) chosen from polyethylene terephthalate (PET), polyethylene naphthalate (PEN), a metal, a mineral or organic semiconductive material, and mixtures thereof.

In a first embodiment of the process of the invention, the surface of the substrate S comprises regions made of a metal chosen from Al, Au, Cu and Ag and mixtures thereof.

In a second embodiment of the process of the invention, the surface of the substrate S comprises regions made of aluminum and the reactive group F2 of the molecule F is a phosphonic acid group.

In a third embodiment of the process of the invention, the surface of the substrate S comprises regions made of gold and the reactive group F2 of the molecule F is a thiol group.

The material M is chosen from the group of materials based on acrylate, such as poly(ethylene glycol) diacrylate (PEGDA), urethane acrylate, such as the series of hydroxy-functional hyperbranched polyurethane acrylates (WHPUD) sold under the brand name Boltorn® H20 described by Anila Asif et al. in "Photopolymerization of waterborne polyurethane acrylate dispersions based on hyperbranched aliphatic polyester and properties of the cured films", Colloid Polym. Sci. (2005) 283: 721-730, styrene, such as the polystyrene of polymerization initiated by tetraphenyl cyclopentadiene triphenyl bismuthonium which is described by Kaur et al. in "Photopolymerization of styrene initiated by triphenyl bismuthonium ylide", Macromol. Rapid Commun. 21, 291-295 (2000), and/or divinyl ether such as poly(vinyl cinnamates).

The reactive group F1 of the molecule F is chosen from a silyl group and a π-conjugated group.

The molecule F is chosen from trimethylsilylpropanethiol and trimethoxysilylpropanethiol.

The invention also proposes a process for manufacturing a transistor, characterized in that it comprises at least one step of performing the process for improving the adhesion of a layer made of the material M, which can be crosslinked by exposure to UV rays, to a substrate.

The invention will be better understood, and other advantages and characteristics thereof will emerge more clearly, when reading the explanatory description that follows.

DETAILED DESCRIPTION OF THE EMBODIMENTS

In general, the invention relates to a process for improving the adhesion of a layer made of a material that can be crosslinked by exposure to UV rays to the surface of a substrate S, which may be made of any material, but which is made of a different material from the material M.

With this aim, the invention proposes to deposit, between the layer of material M and the surface of the substrate S, a nonpolymerized polymerizable composition comprising at least one molecule comprising a first reactive group F1, which is capable of reacting by exposure to UV rays, with a reactive group M1 of the material M and a second reactive group F2 that is capable of forming a bond with the material(s) constituting the surface of the substrate S, and then in polymerizing the whole, to bring about crosslinking of the material M and reaction of the reactive groups F1 with the reactive groups F1 of the molecule F with the reactive groups M1 of the material M.

Thus, the layer of polymerizable composition P is perfectly bonded to the layer of material M during the exposure to UV rays.

The molecule F also comprises a reactive group F2 that is capable of forming a bond with the material(s) constituting the surface of the substrate S.

Specifically, as has been seen, in particular in the case of a transistor, the surface of the substrate S may be either a surface formed entirely from the same material, or may comprise regions made of a metal and/or of an insulating material such as $SiO_2$.

These bonds may be intramolecular bonds between the material(s) constituting the surface of the substrate S and the group F2.

In one preferred embodiment, the surface of the substrate S is made of a material chosen from polyethylene terephthalate (PET), polyethylene naphthalate (PEN), a metal, more particularly gold, aluminum, copper or silver, an inorganic semiconductive material such as silicon, germanium or gallium arsenide, an organic semiconductive material such as a material based on modified pentacene, for example TIPS-pentacene, perylene or a derivative thereof, a diimide-based material such as naphthalenetetracarboxylic diimide or made of an insulating material such as silica.

Specifically, these materials are used for the manufacture of transistors.

The surface of the substrate S may also comprise regions made of one or more of these materials, for instance made of polyethylene terephthalate (PET) comprising regions made of metal, or alternatively a semiconductive, mineral or organic material comprising metallic regions.

In one most particularly preferred embodiment, the metal is aluminum or gold.

When the metal is aluminum, the reactive group F2 is preferably a phosphonic acid group.

However, in yet another preferred embodiment of the process of the invention, the metal is gold.

In this case, the reactive group F2 of the molecule M is preferably a thiol group.

As regards the material M, it may be a material comprising groups based on diacrylate, diurethane acrylate, distyrene or divinyl ether, for instance a poly(vinyl cinnamate).

This material is preferably a dielectric material since it is generally such a material that is used for transistors.

The reactive group F2 of the molecule F has the function of reacting with the crosslinkable material M during its exposure to UV rays.

This second reactive group F2 may be a silyl group, or a π-conjugated group such as an alkene or ketone group.

One particularly preferred example of a molecule F is a molecule comprising a thiol group and a silyl group, such as trimethylsilylpropanethiol and trimethoxysilylpropanethiol.

Thus, the process for improving the adhesion of a layer made of a material M to a substrate S is particularly advantageously used in a process for manufacturing a transistor.

Consequently, the invention also proposes a process for manufacturing a transistor, which comprises at least one step of performing the process for improving the adhesion of a polymeric material, which is crosslinkable by UV exposure, to a substrate.

An implementation example will now be described, for purely nonlimiting illustrative purposes, in order to understand the invention more clearly.

EXAMPLE 1

The substrate used here is a plastic substrate, more specifically made of polyethylene naphthalate, onto which is deposited a gold grille by evaporation through a mask.

The thickness of the grille obtained is 90 nm.

Thus, the substrate used here is a surface comprising regions made of polyethylene naphthalate and regions made of gold.

On the surface of this substrate, a nonpolymerized polymerizable composition according to the invention, in this case trimethoxysilylpropanethiol, is deposited onto the grille.

This composition adheres immediately to the grille by creation of S—Au covalent bonds between the gold of the grille and the polymerizable composition.

Next, a UV-crosslinkable polymer is deposited by spin-coating onto the entire surface of the substrate.

The thickness of the deposited polymer layer is 850 nm.

The UV-crosslinkable polymer is, in this example, poly (vinyl cinnamate).

Next, the surface of the substrate is exposed through a mask to a UV lamp placed 10 cm from the surface of the substrate covered with acrylate polymer.

The exposure time is 45 minutes. It is performed at a wavelength of 365 nm at a power of 14 mW/cm$^2$.

During this exposure, the polymer and the trimethoxysilylpropanethiol polymerizable composition crosslink, bringing about adhesion of the polymer to the surface of the substrate.

Annealing is then performed at 100° C. for 20 minutes to effect drying.

The nonexposed regions of polymer and of trimethoxysilylpropanethiol are removed with a revealer, tetrahydrofuran (THF), to expose the patterns.

The substrate thus obtained is used for the manufacture of source and drain electrodes.

This is done by depositing a layer of gold 60 nm thick, deposited by evaporation through a mask.

Next, the semiconductive material, in this case pentacene, is deposited by spin-coating to obtain a transistor.

The transistor obtained has excellent properties, in particular in terms of adhesion.

The invention claimed is:

1. Process for improving the adhesion of a layer made of a material M to the surface of a substrate S, wherein the material M is a material that can be crosslinked by exposure to UV rays, and the process comprises:
    a) deposition, on at least one surface of the substrate S, of a nonpolymerized polymerizable composition P, comprising at least one molecule F comprising a first reactive group F1 that is capable of reacting, by exposure to UV rays, with a reactive group M1 of the surface of the material M, and a second reactive group F2 that is capable of forming bonds with the material(s) constituting the surface of the substrate S,
    b) deposition, onto the layer of the nonpolymerized composition P obtained in step a), of a layer made of a noncrosslinked material M, and
    c) exposure to UV rays of the three-layer structure obtained in step b).

2. Process according to claim 1, wherein the surface of the substrate S comprises regions made of gold and in that the reactive group F2 of the molecule F is a thiol group.

3. Process according to claim 2, wherein the molecule F is chosen from trimethylsilylpropanethiol and trimethoxysilylpropanethiol.

4. Process according to claim 1, wherein the surface of the substrate S comprises at least one region made of one (or more) material(s) chosen from polyethylene terephthalate (PET), polyethylene naphthalate (PEN), a metal, a mineral or organic semiconductive material, and mixtures thereof.

5. Process according to claim 1, wherein the surface of the substrate S comprises regions made of a metal chosen from Al, Au, Cu and Ag and mixtures thereof.

6. Process according to claim 1, wherein the surface of the substrate S comprises regions made of aluminum and in that the reactive group F2 of the molecule F is a phosphonic acid group.

7. Process according to claim 1, wherein the material M is chosen from the group of materials based on acrylate, urethane acrylate, styrene and/or divinyl ether.

8. Process according to claim 1, wherein the reactive group F1 of the molecule F is chosen from a silyl group and a π-conjugated group.

9. Process for manufacturing a transistor, comprising at least one step of performing the process for improving the adhesion of a layer made of a material M that is crosslinkable by exposure to UV rays to a substrate according to claim 1.

* * * * *